(12) United States Patent
Hirvonen et al.

(10) Patent No.: US 12,277,804 B2
(45) Date of Patent: Apr. 15, 2025

(54) SPOOF DETECTION USING CATADIOPTRIC SPATIOTEMPORAL CORNEAL REFLECTION DYNAMICS

(71) Applicant: Jumio Corporation, Sunnyvale, CA (US)

(72) Inventors: David Hirvonen, New York City, NY (US); Spandana Vemulapalli, Kansas City, MO (US)

(73) Assignee: Jumio Corporation, Sunnyvale, CA (US)

( * ) Notice: Subject to any disclaimer, the term of this patent is extended or adjusted under 35 U.S.C. 154(b) by 0 days.

(21) Appl. No.: 18/731,038

(22) Filed: May 31, 2024

(65) Prior Publication Data

US 2024/0321013 A1    Sep. 26, 2024

Related U.S. Application Data

(63) Continuation of application No. 17/471,712, filed on Sep. 10, 2021, now Pat. No. 12,014,577.

(51) Int. Cl.
*G06V 40/40* (2022.01)
*G06F 21/32* (2013.01)
*G06T 7/00* (2017.01)
*G06T 7/62* (2017.01)
*G06V 40/18* (2022.01)

(52) U.S. Cl.
CPC .............. *G06V 40/45* (2022.01); *G06F 21/32* (2013.01); *G06T 7/62* (2017.01); *G06T 7/97* (2017.01); *G06V 40/193* (2022.01)

(58) Field of Classification Search
CPC ....................................................... G06F 21/32
See application file for complete search history.

(56) References Cited

U.S. PATENT DOCUMENTS

| 11,080,516 B1* | 8/2021 | Joshi ...................... G06V 40/19 |
| 2017/0026413 A1 | 1/2017 | Goldschlag | |
| 2017/0105619 A1* | 4/2017 | Ebisawa .............. A61B 3/0025 |
| 2017/0206413 A1* | 7/2017 | Hanna .................. G06V 40/165 |

(Continued)

OTHER PUBLICATIONS

Vaas, Lisa, sophos.com [online], "Google files patent to let you unlock your phone by grimacing at it." Naked Security, Jun. 12, 2013, retrieved on Oct. 18, 2021, retrieved from URL <https://nakedsecurity.sophos.com/2013/06/12/google-files-patent-to-let-you-unlock-your-phone-by-grimacing-at-it/>, 11 pgs. Jun. 12, 2013.

(Continued)

*Primary Examiner* — Edward Park
(74) *Attorney, Agent, or Firm* — Patent Law Works LLP

(57) ABSTRACT

Methods, systems, and computer-readable storage media for determining that a subject is a live person include obtaining, by an image capture device, a set of subject images. Each image is captured at a different corresponding relative location of the image capture device with respect to the subject. Parameters are determined from the set of images of the subject. The parameters represent corneal reflections of at least one object in at least one eye of the subject. A determination is made, based on the parameters, that the subject is a live person. Responsive to determining that the subject is a live person, an authentication process is initiated to authenticate the subject.

20 Claims, 8 Drawing Sheets

(56) References Cited

U.S. PATENT DOCUMENTS

2017/0323167 A1* 11/2017 Mapen .................. G06T 7/90
2020/0410215 A1    12/2020 Yoo

OTHER PUBLICATIONS

PCT International Search Report and Written Opinion; Application No. PCT/US2022/043113 Jumio Corporation, International filing date of Sep. 9, 2022, date of mailing Jan. 3, 2023, 12 pages. Jan. 3, 2023.

* cited by examiner

SPOOF DETECTION USING CATADIOPTRIC SPATIOTEMPORAL CORNEAL REFLECTION DYNAMICS

CROSS-REFERENCE TO RELATED APPLICATIONS

This application is a continuation of and claims priority to U.S. patent application Ser. No. 17/471,712, filed Sep. 10, 2021, and titled "Spoof Detection Using Catadioptric Spatiotemporal Corneal Reflection Dynamics," which is hereby incorporated by reference in its entirety.

TECHNICAL FIELD

This specification generally relates to security control using image capture devices.

BACKGROUND

Malicious actors have been known to attempt to breach the security of face recognition systems by using spoof or alternate representation of a face of an actual user. Some systems use eye-specific cues such as corneal reflection or eye movement cues to differentiate between a live person and spoof or alternate representations of actual users. Examples of such spoof or alternate representations (also referred to as presentation attack instruments) can include a high-resolution image of a subject displayed on a screen or printed as a photograph.

SUMMARY

In one aspect, this document describes a method for controlling access to a secure system based on determining that a subject is a live person. The secure system is a system to which access is controlled, e.g. by using authentication and/or authorization of one or more users trying to access the system. The method includes obtaining, by an image capture device, a set of at least two images of a subject. Each image in the set is captured at a different corresponding relative location of the image capture device with respect to the subject. One or more parameters are determined from the set of images of the subject. The parameters represent corneal reflections of at least one object in at least one eye of the subject. A determination is made, based on the one or more parameters, that the subject is a live person. Responsive to determining that the subject is a live person, an authentication process is initiated to authenticate the subject.

In another aspect, this document describes a system for controlling access to a secure system based on determining that a subject is a live person. The system includes one or more computers; and one or more computer memory devices interoperably coupled with the one or more computers and having tangible, non-transitory, machine-readable media storing one or more instructions that, when executed by the one or more computers, perform various operations. The operations include obtaining, by an image capture device, a set of at least two images of a subject. Each image in the set is captured at a different corresponding relative location of the image capture device with respect to the subject. One or more parameters are determined from the set of images of the subject. The parameters represent corneal reflections of at least one object in at least one eye of the subject. A determination is made, based on the one or more parameters, that the subject is a live person. Responsive to determining that the subject is a live person, an authentication process is initiated to authenticate the subject.

In another aspect, this document describes one or more non-transitory computer-readable storage devices coupled to one or more processors and having instructions stored thereon which, when executed by the one or more processors, cause the one or more processors to perform various operations. The operations include obtaining, by an image capture device, a set of at least two images of a subject. Each image in the set is captured at a different corresponding relative location of the image capture device with respect to the subject. One or more parameters are determined from the set of images of the subject. The parameters represent corneal reflections of at least one object in at least one eye of the subject. A determination is made, based on the one or more parameters, that the subject is a live person. Responsive to determining that the subject is a live person, an authentication process is initiated to authenticate the subject.

Implementations of the above aspects can include one or more of the following features. The one or more parameters can include a reflection size. Determining the one or more parameters can include: determining a first size of a reflection of the at least one object in a first image of a particular eye of the subject, the first image being included in the set of the at least two images and captured with the image capture device being at a first distance from the particular eye, and determining a second size of a reflection of the at least one object in a second image of the particular eye, the second image being included in the set of the at least two images and captured with the image capture device being at a second distance from the particular eye, and the second distance being different from the first distance. Determining that the subject is a live person can include determining that the first size is different from the second size and determining that the subject is a live person responsive to determining that the first size is different from the second size. Determining the one or more parameters can include: determining a first separation between the corresponding reflections of the at least one object in the two eyes of the subject in a first image, the first image being included in the set of the at least two images and captured with the image capture device being at a first relative location with respect to the subject, computing a first parameter of the one or more parameters as a function of a ratio of the first separation to an inter-ocular distance measured from the first image, determining a second separation between the corresponding reflections of the at least one object in the two eyes of the subject in a second image, the second image being included in the set of the at least two images and captured with the image capture device being at a second relative location with respect to the subject, and computing a second parameter of the one or more parameters as a function of a ratio of the second separation to an inter-ocular distance measured from the second image. Determining that the subject is a live person can include determining that the first parameter is different from the second parameter and determining that the subject is a live person responsive to determining that the first parameter is different from the second parameter. Determining that the subject is the live person can include processing the set of the at least two images of the subject using a machine learning process trained to discriminate between live persons and alternative representations of the live persons based on the one or more parameters.

Particular implementations of the subject matter described in this disclosure can be implemented so as to realize one or more of the following advantages. The technology described herein can be used to reduce vulnerabilities of spoof detection systems that rely on eye-specific cues like corneal reflection of the environment to determine whether or not an image is fake. For example, in order to make a spoof image appear like a properly captured selfie-image, the spoof image can be manipulated to include reflections of a mobile device visible on the corneas. The technology described herein addresses this vulnerability by capturing multiple images of a subject with a particular object (e.g., the mobile device capturing the image) at different distances from the subject and analyzing one or more parameters representing the dynamic nature of the corneal reflections of the object.

The implementations of the present disclosure can therefore facilitate implementation of spoof detection based on leveraging the change in size/relative position of reflections of objects in the corneas with varying relative distance of the objects from the corneas. This spoof detection system can be implemented on resource-constrained environments such as mobile devices. The implementations of the present disclosure does not require previous acquisition and storage of user images or videos on a database because liveness detection can be performed based on images captured at run-time, without a need to perform any comparison with previously captured user images or videos. By allowing a quick discrimination between captured images of a live person and captured images of a presentation attack instrument (e.g., a static or dynamic alternative representation of a subject), additional processing can be preemptively terminated, thereby creating an additional layer of security.

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

Like reference numbers and designations in the various drawings indicate like elements.

DETAILED DESCRIPTION

Figure 1:
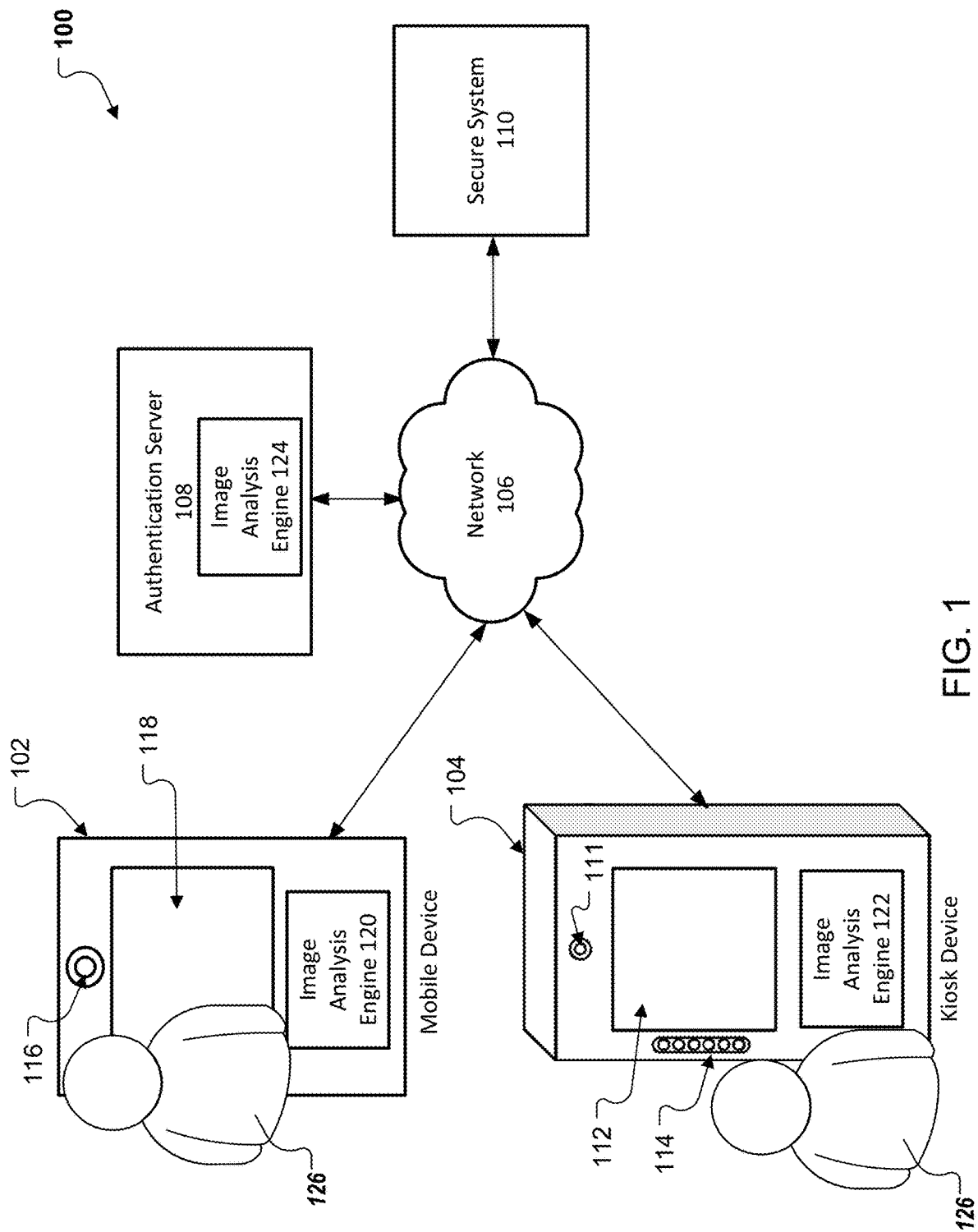
FIG. 1 depicts an example architecture in which the implementations of the present disclosure may be used.

Implementations of the present disclosure are directed to detecting presentation attack instruments (e.g., alternative representation of subjects such as images of the subjects displayed on a screen or printed as a photograph) that attempt to breach the security of biometric authentication systems that rely on features of human faces or portions thereof. More particularly, implementations of the present disclosure are directed to extracting corneal reflections corresponding to one or more objects such as a mobile device, determining, based on the dynamics of the corneal reflections whether or not the subject is a live person, and in response, continuing or aborting, respectively, the underlying biometric authentication process for accessing a secure system.

Biometric authentication systems can capture one or more images of a user and can execute corresponding authentication processes on the captured image. Malicious attempts to breach the security of such a biometric authentication system can include presenting an alternative representation of a live person (also referred to as a spoof), including, for example, high resolution images displayed on a monitor or photographs printed on paper. In some cases, to misrepresent a spoof image as an authentic image, the images may be processed to include various realistic details. For example, to make a spoof image appear like an authentic selfie-mode image, the spoof image can be processed to include a reflection of one or more objects of an environment (e.g., a mobile device that is made to appear as the device that has captured the image). This can be done, for example, by including in the eyes with pre-existing reflections, or pseudo-reflections. Images processed at such a level of sophistication may be used for spoof attacks against systems that discriminate between spoof and real images simply by searching for details of reflections visible on the cornea.

The technology described herein attempts to improve robustness of spoof detection by detecting such sophisticated spoof attacks. Specifically, the technology leverages catadioptric properties of the cornea to detect changes in one or more parameters of a reflection of an object by capturing multiple images of the subject with the object being at various relative distances from the subject. In some implementations, the technology described in this document relies on capturing multiple images at various relative locations of an image capturing device with respect to a subject and detecting whether one or more parameters of the reflections visible on the cornea (e.g., location, size etc. of the reflected objects) changes with the various different relative locations. For a live image of a human being, the parameters of the reflected objects would vary with the different relative locations, but such variations would likely not be present in spoof images. This differential property may be used to discriminate between real images and spoofs.

In some implementations, light emanating from the screen of a mobile device can be tracked as a reflected object as a user captures a self-portrait (colloquially often referred to as a "selfie") with a mobile device. For example, at least two images can be captured with the mobile device being at two different relative locations with respect to the subject, and parameters such as size, location etc. of the reflected object can be determined to determine whether such parameters are varying with different relative locations, as may be expected for a live subject. Knowledge of catadioptric reflective properties of live eyes can be leveraged to measure changes in one or more parameters of reflections between captured images corresponding to different relative distances between the subject and the objects whose reflections are being tracked (also referred to herein as optical targets).

In some implementations, a spoof image can be distinguished from a live image by tracking the dynamics of the reflected objects. For example, images of alternative representations of a subject with pre-existing reflections do not exhibit changes as expected from a catadioptric system, such as a human eye. Similarly, pseudo-reflections arising from bright spots in digital images and photos (possibly representing the reflection of the mobile device or another light source from the surface of a photograph or screen on which the digital image is displayed) are likely to be inherently more static in nature. In contrast, the parameters of the reflected objects in an image of a live subject would change with the varying relative locations of the image capture device with respect to the subject, and such dynamics can be used to discriminate between live and spoof images.

In some cases, even more sophisticated spoof attacks may contemplate introducing some dynamics in the parameters of the objects seen reflected on the cornea. In some implementations, in addition to detecting whether or not the properties of the reflections are changing with varying relative locations, the nature of the changes may also be tracked to see if they conform to what may be expected due to the catadioptric reflective properties of the cornea. If the observed changes are similar to the expected changes, the subject can be determined as a live person. On the other hand, if the observed changes do not comport with the changes expected from the catadioptric reflective properties, the subject can be determined as likely being a spoof or alternate representation of a live person. The changes in the reflections can be tracked using various parameters of the reflections, including, for example, (a) changes in the detected reflection coordinates in the reflections observed in the two eyes (e.g., as measured using an inter-reflectionary to inter-ocular distance ratio), and/or (b) changes in shape of a reflection observed in each eye due to a corresponding object (e.g., a mobile device) being moved closer or away from the subject. The expected changes can be determined, for example, based on a machine learning model trained on a training corpus of real and spoof images such that the machine learning model learns to accurately discriminate between live and spoof images based on nature of variations in the reflected objects with varying relative locations of the subject and image capture device. Discriminating between live and spoof images based on such models that capture the nature of changes in the parameters of the reflected objects may further increase robustness of the spoof detection systems by potentially detecting more sophisticated spoof attacks.

FIG. 1 depicts an example architecture 100 in accordance with implementations of the present disclosure. In the depicted example, the example architecture 100 includes user devices 102, 104, a network 106, an authentication server 108, and a secure system 110. In the depicted example, a user 126 interacts with the user devices 102, 104.

In some implementations, the user devices 102, 104 can communicate with the authentication server 108 and the secure system 110 over the network 106. The network 106 includes one or more of the following: a local area network (LAN), wide area network (WAN), the Internet, a virtual private network (VPN), etc., or a combination thereof. The network 106 connects user devices (e.g., the user device 104, or the user device 102, etc.), the authentication server 108, and the secure system 110. In some implementations, the network 106 can be accessed over a wired and/or a wireless communications link.

In some implementations, the user devices 102, 104 include image capture devices, such as a desktop computer, a laptop computer, a handheld computer, a tablet computer, a personal digital assistant (PDA), a cellular telephone, a wearable device (e.g., smart watch or smart glasses), a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the user device 102 can be a mobile device. The user device 102 can be used for various purposes that require authenticating users 126 via one or more biometric authentication processes. For example, the user device 102 can be used to authenticate a user for one or more services (e.g., a payment processing service) that are available to the user 126 via an application executing on the user device 102. The application executing on the user device 102 can require the user to be authenticated via a biometric authentication process before allowing access to a secure system 110 associated with requested services. In some implementations, a biometric authentication process that is based on illuminated corneal reflections from a live user and may require capture of a facial image of the user 126.

The user device 102 (e.g., mobile device) can include a camera 116 that can be employed to capture images of the user 126 of the user device 102. The user device 102 can include a display panel 118 (e.g., a touch screen) that allows a user to interact with the user device 102, e.g., performing a payment process on the mobile device. In some implementations, the user device 102 automatically captures multiple images at different relative locations of the user device 102 and the subject (for example, as the subject lifts the user device towards the face/eyes), and liveness detection is performed based on such images. In some implementations, the user device 102 can use an active change of optical target. For example, a subject may be affirmatively instructed to hold the user device 102 at particular relative locations with respect to the subject and the set of images used in liveness detection may be captured accordingly. The corresponding reflections of the user device 102 can then be tracked for variations in shape, size, location etc. to determine whether the subject is a live human being or a spoof or alternate representation of a live person. In some implementations, the sequence of relative locations at which the user is instructed to hold the user device 102 can be randomized to further increase the robustness of the liveness detection process.

In some implementations, e.g., a large-screen device (such as a kiosk device 104) can display on the display panel 112 the optical target for the user 126 at a sequence of positions. The user device 104 can use the camera 111 to capture a sequence of images of the face of the user 126 corresponding to the various optical target positions displayed on the screen. Liveness detection can be performed by tracking the corresponding reflections of the optical targets in the portions of the images corresponding to the corneas of the user 126. More details of generating the optical target position sequences and the selection process are described below in connection with FIGS. 4A and 4B.

In some implementations, the user device 104 (e.g., kiosk device) can be used for various processes that require authenticating users 126 via one or more biometric authentication processes. For example, the user device 104 can include an ATM that allows a user 126 to withdraw money from a bank account. In another example, the user device 104 can be deployed at a service or asset providing location (e.g., restaurant or a fast-food outlet), and can allow a user 126 to order and purchase a service or an asset (e.g., merchandise or food). The user device 104 can also be deployed at an entry point of an event center or a service center (e.g., at the gate of an arena, a convention center, a stadium, a transportation station or airport) or at various types of locations to authenticate users interactively, or even without any active participation of the user.

In some implementations, the user device 104 can include one or more components and features that support a liveness detection system. The user device 104 can include a camera 111. The camera 111 can be employed to capture images of, for example, users 126 interacting with the user device 104 or being in the proximity the user device 104. The user device 104 can include a display panel 112 (e.g., a capacitive touch screen) that allows a user to interact with the user device 104, e.g., selecting and ordering food at a retail outlet. Once the user completes the interaction via user-interfaces presented on the display panel 112, the user may be provided with instructions to perform one or more operations (e.g., follow an optical target on the display panel 112) for biometric authentication. The biometric authentication process performed using example architecture 100 shown in FIG. 1 can include a liveness detection process. Multiple images captured using the camera 111 can be analyzed to determine whether the images captured using the camera 111 correspond to an actual live person or if the images correspond to an alternative representation of the live person. For example, an alternative representation of a live person can include a picture of the live person or a video replay of the live person, and so on. The user device 104 can be configured to illuminate the user during the biometric authentication process. The user device 104 can illuminate the user using the display panel 112 or an illumination source 114 that can be separate from the display panel 112. Although one illumination source 114 is shown in FIG. 1, the device 104 may include multiple illumination sources. Although some implementations of the present disclosure are described as using one illumination source, multiple illumination sources can be used.

The user device 104 can use the camera 111 to capture images of the illuminated user 126. The captured images can be temporally synchronized with a display of optical target positions. For example, the camera 111 can capture the first image at a time point during a time interval when the display panel 112 displays the optical target at a first position. The camera 111 can capture the second image, third image, fourth image, and fifth image during corresponding time intervals that are synchronized with the display of the optical target at different positions in the selected optical target position sequence.

In some implementations, the image analysis engine can be located at a remote location with respect to the user device 102 or 104. For example, the image analysis engine 124 can be implemented on a server that is remotely located with respect to a user device 102 or user device 104 on which the sequence of images is captured. As shown in FIG. 1, for example, the image analysis engine 124 can be implemented on the authentication server 108. In such cases, the user devices 102 or 104 can communicate with the image analysis engine 124 over one or more networks 106.

In some implementations, at least a portion of the image analysis engine can be located on the same user device 102, 104 that captured the sequence of images. For example, the user devices 102, 104 can include an image analysis engine 122 configured to discriminate between images of live subjects and a spoof or alternate representation of a live person. In some implementations, the user devices 102, 104 can send the captured images over the network 106 to another entity (e.g., the authentication server) that implements a remote image analysis engine 124. In some implementations, the image analysis engine can be configured to process the captured images using a machine-learning algorithm trained to discriminate between images of live subjects and images of alternative representations of subjects.

In accordance with implementations of the present disclosure, and as noted above, the authentication server 108 controls whether user devices 102, 104 can have access to the secure system 110. For example, the image analysis engine 120, 122, 124 can determine that the captured images of the user 126 in the sequence of images correspond to an alternative representation of a live person. Alternative representations of a live person can be an indicator of a malicious attempt of unauthorized access to the secure system 110, in which the perpetrator of the attempt points the user device 102, 104 towards a high-quality photograph of an authorized user that is printed on paper, or a recorded video of the authorized user displayed on a high-resolution display panel. In response to determining that the user 126 is an alternative representation of a live person, the image analysis engine 120, 122, 124 can preemptively prevent any of the images to be further processed by the authentication server 108, thereby controlling access to the secure system 110. If the image analysis engine 120, 122, 124 determines that the images of the user 126 correspond to a live person, an authentication process based on one or more images of the user 126 can be initiated (e.g., at the authentication server 108) to determine if the live person is authorized to access the secure system. For example, after determining the liveness detection result, the user device 102 or the user device 104 can send the liveness detection result to the authentication server 108 over a network 106. Based on the liveness detection result, the authentication server 108 can continue or abort an access attempt to the secure system 110.

Figure 2A:
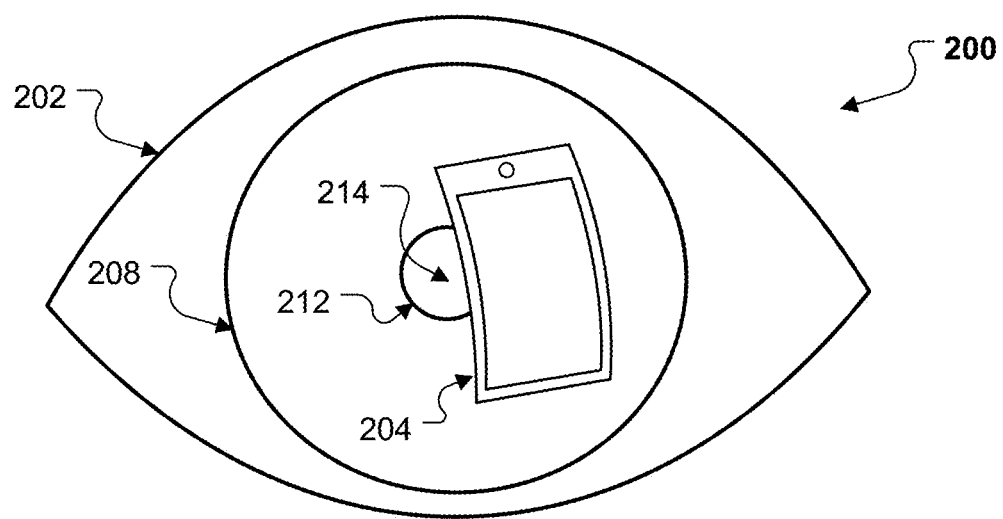
FIGS. 2A and 2B depict examples of eye images in accordance with implementations of the present disclosure.
Figure 2B:
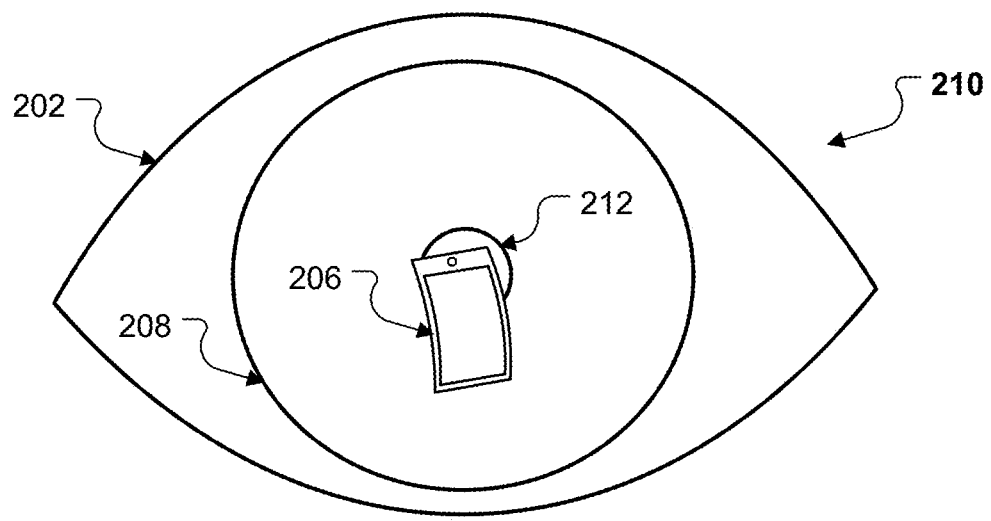

FIGS. 2A and 2B show examples of eye images 200, 210 generated during a liveness detection process in accordance with the technology described herein. The examples of the eye images 200, 210 can be extracted from a pair of images of a subject captured by a mobile device (e.g., a phone or a tablet) positioned at two different distances (and orientations) relative to an eye of the subject. In some implementations, the extraction process generates cropped images including a single eye 202 (e.g., only the left eye or only the right eye, which is consistently extracted from all captured images) as the region of interest.

The examples of the eye images 200, 210 can include one or more features of the eye and a reflection 204, 206 of the mobile device used to capture the images 200, 210. The eye images 200, 210 can be processed to determine one or more reflection parameters of each reflection 204, 206. The reflection parameters can include, for example, area of reflection, height of reflection, width of reflection, and diagonals of reflection. The eye images 200, 210 can be processed to determine one or more eye features. The eye features can include any of an iris 208, a pupil 212, and a pupil center 214. The detected reflection parameters can be compared with reference to the detected eye features to determine whether the parameters are changing for different relative location of the object in relation to a reference feature that is assumed to be static (e.g., the pupil center 214). Because the cornea of a live eye functions as a simple reflective catadioptric mirror, the size of the reflection is substantially inversely proportional to distance. For example, under perspective transformation, increasing object depth by a factor of 2 can correspond to a decrease the dimensions of the corresponding reflections on the cornea by half. In some implementations, changes in reflection strength may also be used for the liveness detection purposes. For example, for the same object, the brightness of the reflection can be inversely proportional to the square of the distance, and these dynamics of the reflection strength can be measured for the purposes of the liveness detection process described herein.

As illustrated in FIGS. 2A and 2B, the reflection 204 of the mobile device at a first distance matches the shape (e.g., height to width ration) of the reflection 206 of the mobile device at a second distance. The size (e.g., area, height, width, or diagonal) of the reflection 204 of the mobile device illustrated in FIG. 2A appears larger than the size of the reflection 206 of the mobile device illustrated in FIG. 2B, suggesting that the mobile device was closer to the eye 202 when the image 200 was captured than when image 210 was captured. If the characteristics of the reflection 204, 206 change according to the distance (and orientation) of the mobile device, a determination may be made that the subject is a live human being. In some cases, in addition to detecting that the characteristics are indeed changing, an additional determination may be made to check whether the changes are in accordance with expected changes to the characteristics. For example, the subject may be affirmatively asked to hold the mobile device at certain preset locations (e.g., to the left of the left eye and then to the right of the right eye) and the changes to the corresponding reflection characteristics can be analyzed to determine if the changes are consistent with the expected changes. The expected changes can be determined, for example, by training a machine learning model using a corpus of image pairs representing reflection characteristics for such preset locations.

Figure 3A:
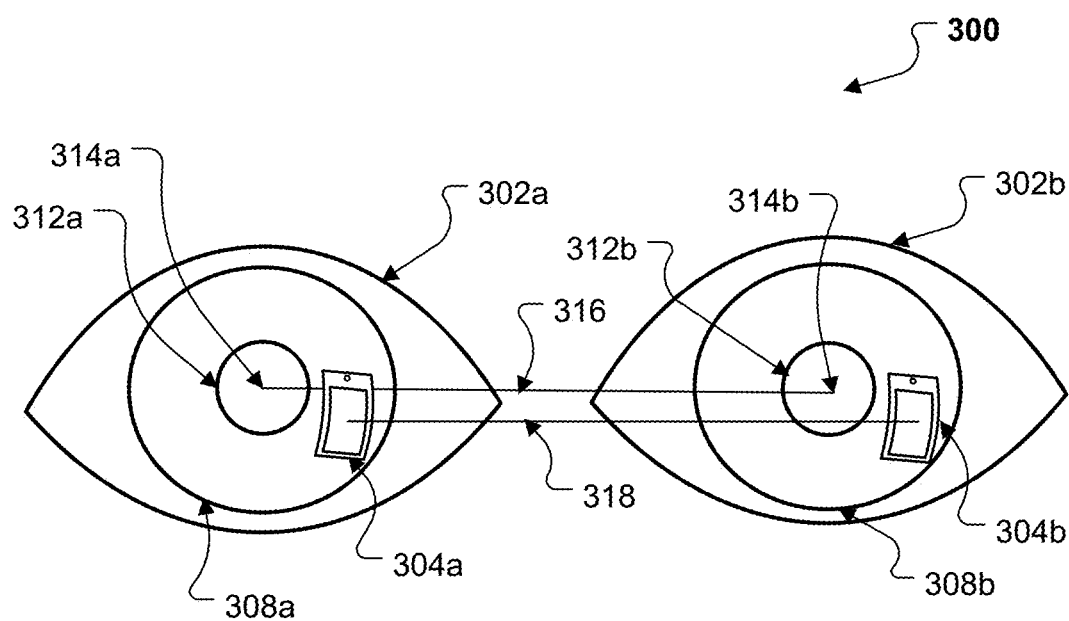
FIGS. 3A and 3B depict examples of eye images in accordance with implementations of the present disclosure.
Figure 3B:
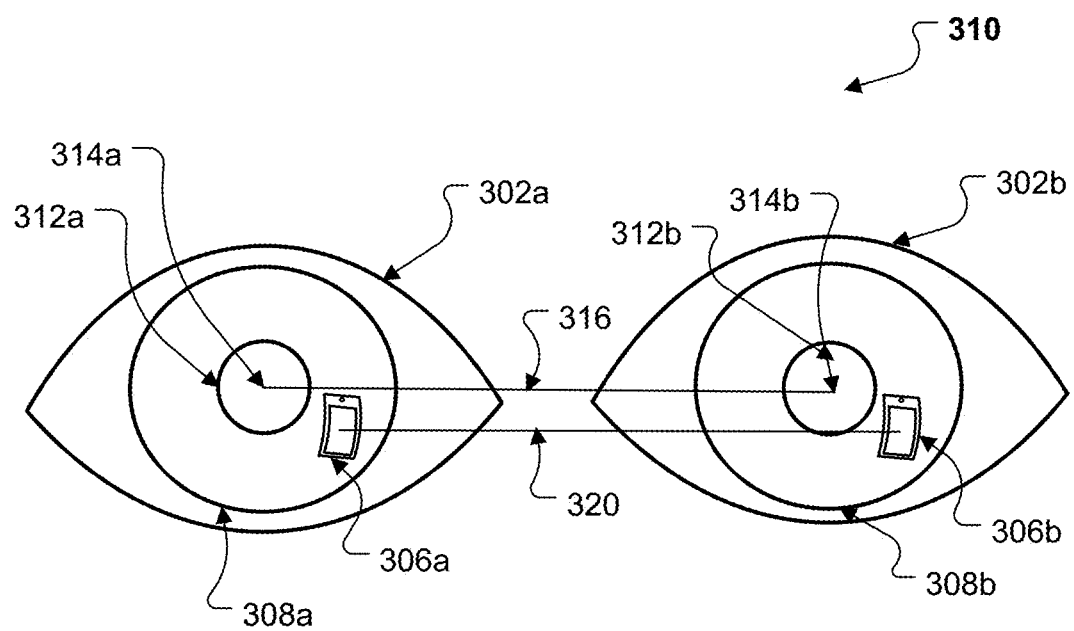

FIGS. 3A and 3B show examples of eye images 300, 310 generated during a liveness detection process for alternative representations of a live person. The examples of the eye images 300, 310 can be extracted from a pair of images of a subject captured by a mobile device (e.g., a phone or a tablet) positioned at two different distances (and orientations) relative to the eyes 302a, 302b of the subject. In some implementations, the extraction process generates cropped images including both eyes 302a, 302b as the region of interest.

The examples of the eye images 300, 310 can include one or more features of the eyes and reflections 304a, 304b, 306a, 306b of the mobile device used to capture the images 300, 310. The eye images 300, 310 can be processed to determine one or more reflection parameters of each reflections 304a, 304b, 306a, 306b. The reflection parameters can include, for example, center of reflection, area of reflection, height of reflection, width of reflection, and diagonals of reflection. In some implementations, the reflection parameters can be processed to determine inter-reflection parameters including a separation 318, 320 between right eye and left eye corneal reflections 304a, 304b, 306a, 306b. Such a separation between the centers of two reflections can be referred to as an inter-reflectionary distance. The inter-reflectionary distance in general is representative of the distance between the reflections of the same object in the two eyes, and can be measured in other ways, for example, as the distance between two points representing a same reference point (e.g., the top right-hand corner of a mobile device) of the object in the two reflections, respectively. The eye images 300, 310 can be processed to also determine one or more eye features that are assumed to be static and therefore serve as reference points for measuring the dynamics of the reflections. The eye features can include, for example, location of an iris 308a, 308b, a pupil 312a, 312b, and a pupil center 314a, 314b. The eye features can be processed to determine inter-ocular parameters including an inter-ocular distance 316. The inter-ocular distance can be measured, for example, as the distance between the pupil centers of the two eyes, or between eye features in the two eyes that are assumed to remain static between the two pairs of images. The detected reflection parameters can be compared to the detected eye features or the inter-ocular distance 316 to determine whether any of the features of the reflections 304a, 304b, 306a, 306b change relative to the selected reference eye feature (e.g., the inter-ocular distance 316). In some implementations, a ratio of the separation 318, 320 to the inter-ocular distance measured from the images 300, 310, respectively, can be measured to determine whether the dynamics of the reflections change with different relative positions of the object with respect to the eye.

As illustrated in FIGS. 3A and 3B, the reflections 304a, 304b of the mobile device at a first distance matches the shape (e.g., height to width ration) of the reflections 306a, 306b of the mobile device at a second distance. The size (e.g., area, height, width, or diagonal) of the reflections 304a, 304b of the mobile device illustrated in FIG. 3A appears larger than the size of the reflections 306a, 306b of the mobile device illustrated in FIG. 3B, suggesting that the mobile device was closer to the eyes 302a, 302b when the image 300 was captured than when image 310 was captured. If the characteristics (size and orientation) of the reflections 304a, 304b, 306a, 306b change according to the distance (and orientation) of the mobile device relative to a constant inter-ocular distance and the changes match predicted reflection characteristics within an acceptable confidence level and margin of error (smaller than a preset threshold), the liveness detection process can indicate that the subject is a live person. In some cases, in addition to detecting that the characteristics are indeed changing, an additional determination may be made to check whether the changes are in accordance with expected changes to the characteristics. For example, the subject may be affirmatively asked to hold the mobile device at certain preset locations (e.g., to the left of the left eye and then to the right of the right eye) and the changes to the corresponding reflection characteristics (e.g., the ratio of the inter-reflectionary distance and the inter-ocular distance) can be analyzed to determine if the changes are consistent with the expected changes. The expected changes can be determined, for example, by training a machine learning model using a corpus of image pairs representing reflection characteristics for such preset locations.

Figure 4A:
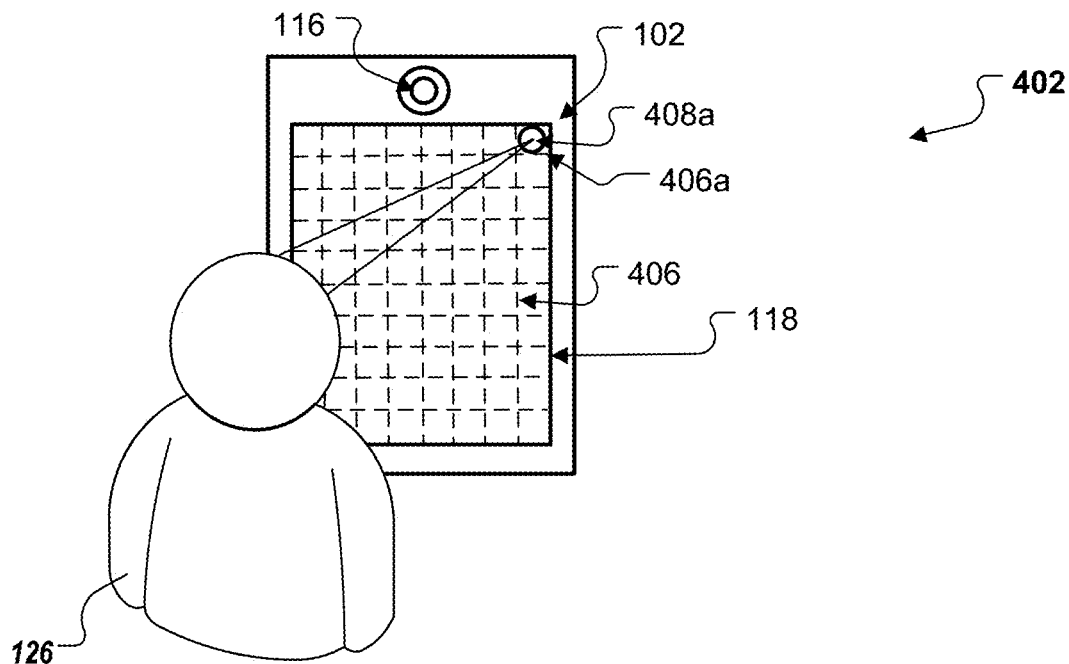
FIGS. 4A and 4B depict configurations for liveness assessment in accordance with implementations of the present disclosure.
Figure 4B:
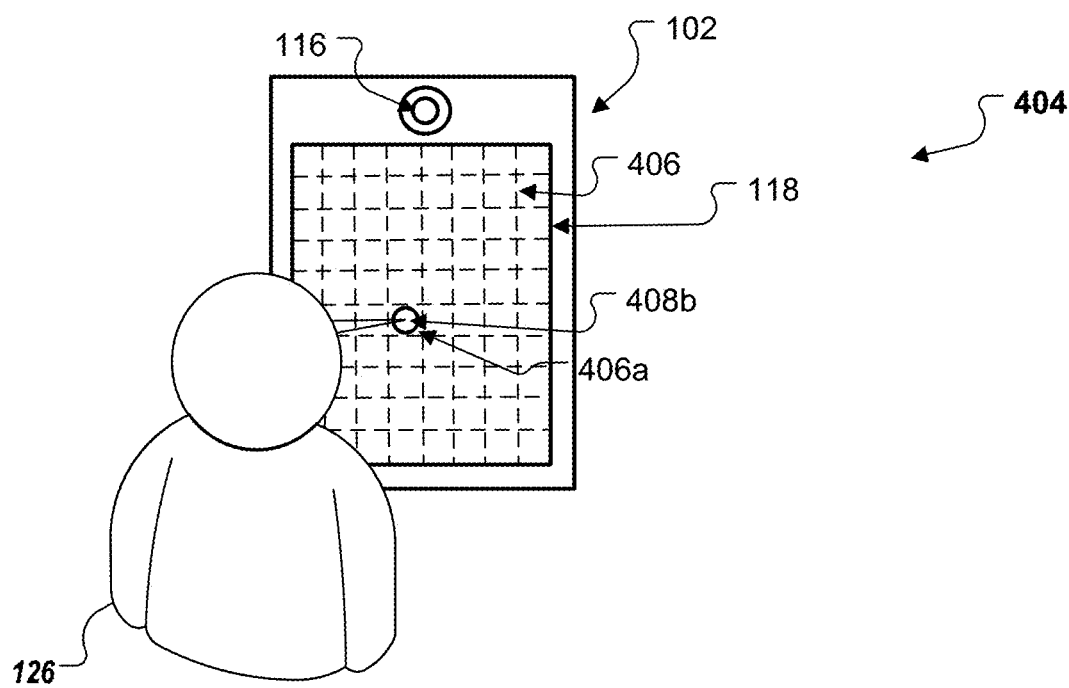

In some implementations, for example in large-screen devices such as kiosks, an optical target may be displayed at various portions of the screen and the corresponding dynamics of the corneal reflection can be analyzed to determine whether the subject is a live human being. FIGS. 4A and 4B show examples of optical target positions 402, 404 in an example of an optical target position sequence from a set of candidate sequences. The display panel 118 can be divided into multiple cells (e.g., display regions of equal size) as defined by a grid 406. The cells can be grouped in multiple columns and multiple rows. One or more optical targets 408a, 408b can be displayed according to an optical target position sequence within any cell of the grid 406, such as cells 406a, 406b. The optical target position sequence 400 includes multiple positions corresponding to multiple cells 406a, 406b that are displayed during successive time intervals. In some implementations, the total number of positions in the optical target position sequence can include 3 to 7 different positions out of 7 or more candidate positions of the total set of candidate sequences. In some implementations, the optical target position sequence includes multiple optical target shapes 408*a*, 408*b* (e.g., circles, squares, rectangles, triangles, etc.) that are displayed in multiple cells 406*a*, 406*b* that are displayed during successive time intervals or are displayed twice at different time intervals. The time intervals can be equal in length or can have different durations. In some implementations, the time intervals can be milliseconds to seconds long. In some implementations, the optical target position sequence defines a position path that corresponds to a regular pattern, such as a letter, a number or a geometrical shape. In some implementations, the optical target position sequence includes a random cell selection, appearing as jumps between different rows and columns of the grid 406.

A user device (e.g., user devices 102, 104 described with reference to FIG. 1) can display an optical target position sequence in the display panel 118 according to a sequence of optical target positions at the predetermined time intervals. For example, the user device can use a display panel to display the sequence of optical target positions as a series of quick flashes that are synchronized with a camera 116 integrated in or coupled with the user device such that the camera captures at least one image of the user's corneal reflections of each optical target position in the optical target position sequence. In some implementations, the captured sequence of images can be correlated with the optical target position sequence to determine whether the captured sequence is legitimate or coming from an attack source.

Figure 5:
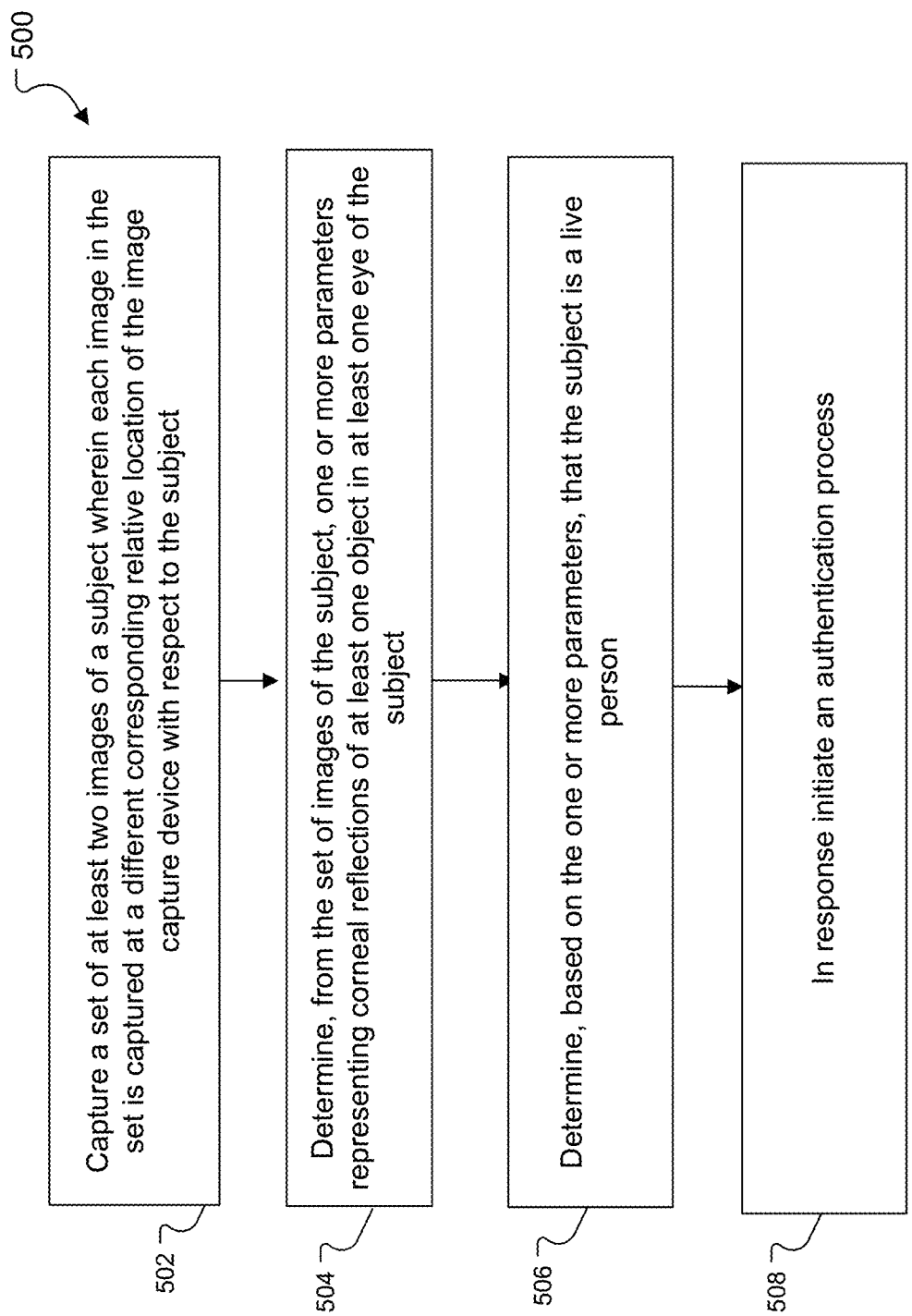
FIG. 5 is a flowchart of an example process in accordance with implementations of the present disclosure.

FIG. 5 is a flowchart of an example process 500 for liveness detection in accordance with the technology described herein. In some implementations, at least a portion of the process 500 can be executed by one or more components of the example architecture 100 described with reference to FIG. 1. In some implementations, at least a portion of the process 600 may be executed by the image analysis engine (e.g., 120 or 122 or 124) depicted in FIG. 1. In some implementations, at least a portion of the process 500 may be executed by one or more servers (e.g., authentication server 108 or computing devices in a distributed computing system as described with reference to FIG. 1) in communication with remote components such as one or more processing devices disposed within a user device (e.g., the user device 102 or the user device 104 as described with reference to FIG. 1).

Operations of the process 500 includes capturing, by an image capture device, a set of at least two images of a subject, wherein each image in the set is captured at a different corresponding relative location of the image capture device with respect to the subject (502). In some implementations, the set of at least two images can be captured automatically as a subject moves the image capture device. For example, in an authentication process, the subject may be asked to capture facial images, and the set of at least two images may be captured automatically at two different relative distances as the subject holds up a mobile device. In some implementation, the set of two images may be captured responsive to affirmatively asking the subject to hold a mobile device at two different relative locations with respect to the face of the subject.

Operations of the process 500 also includes determining, from the set of images of the subject, one or more parameters representing corneal reflections of at least one object in at least one eye of the subject (504) and determining based on the one or more parameters that the subject is a live person (506). This can include, for example, a reflection size as visible in a particular eye in the two images (as also described in the illustrative example of FIGS. 2A and 2B).

In some implementations, determining the one or more parameters can include determining a first size of a reflection of the at least one object in a first image of a particular eye of the subject, and determining a second size of a reflection of the at least one object in a second image of the particular eye. Both the first image and the second image are captured with the image capture device being at a first distance and a second, different distance from the particular eye. A determination may be made that the first size is different from the second size, and in response it may be determined that the subject is a live person.

In some implementations, the set of images can include images of both eyes. In such cases, determining the one or more parameters can include determining a first separation between the corresponding reflections of the at least one object in the two eyes of the subject in a first image that is captured with the image capture device being at a first relative location with respect to the subject, and computing a first ratio (or a function thereof) of the first separation to an inter-ocular distance measured from the first image. This is also described in the illustrative example of FIG. 3A. Also, the process includes determining a second separation between the corresponding reflections of the at least one object in the two eyes of the subject in a second image captured with the image capture device being at a second, different relative location with respect to the subject, and computing a second ratio (or a function thereof) of the second separation to an inter-ocular distance measured from the second image. This is described in the illustrative example of FIG. 3B. If the first ratio is different from the second ratio, a determination may be made that the subject is a live person.

The operations of the process can include initiating or continuing with an authentication process in response to determining that the subject is a live person (508). Conversely, if a determination is made that the subject is likely a spoof representation intended to be a presentation attack instrument, any underlying authentication process can be preemptively aborted to save spending of any additional resources on the process.

In some implementation, determining that the subject is a live person can include processing the set of at least two images of the subject using a machine learning model (e.g., a deep learning model) that is trained to discriminate between live persons and alternative representations of the live persons based on the one or more parameters. For example, the machine learning process can be configured to process a trained classification algorithm trained using a corpus of sample reflection pairs of live people and sample reflection pairs of spoof images. The trained classification algorithm can be configured to detect subtle changes in shape, depth, and other features of reflections as they vary with changing relative distances. In some implementations, the trained classification algorithm can output a probability associated with a set of input images of a subject is that of a live person. In some implementations, the machine learning model can include one or more convolutional neural network (CNN) models. If it is determined that reflections are present and they change with variations in the relative distance, an authentication process to authenticate the subject can be continued or initiated. In some implementations, the authentication process includes providing an output indicating the classification result (e.g., live person detected).

Figure 6:
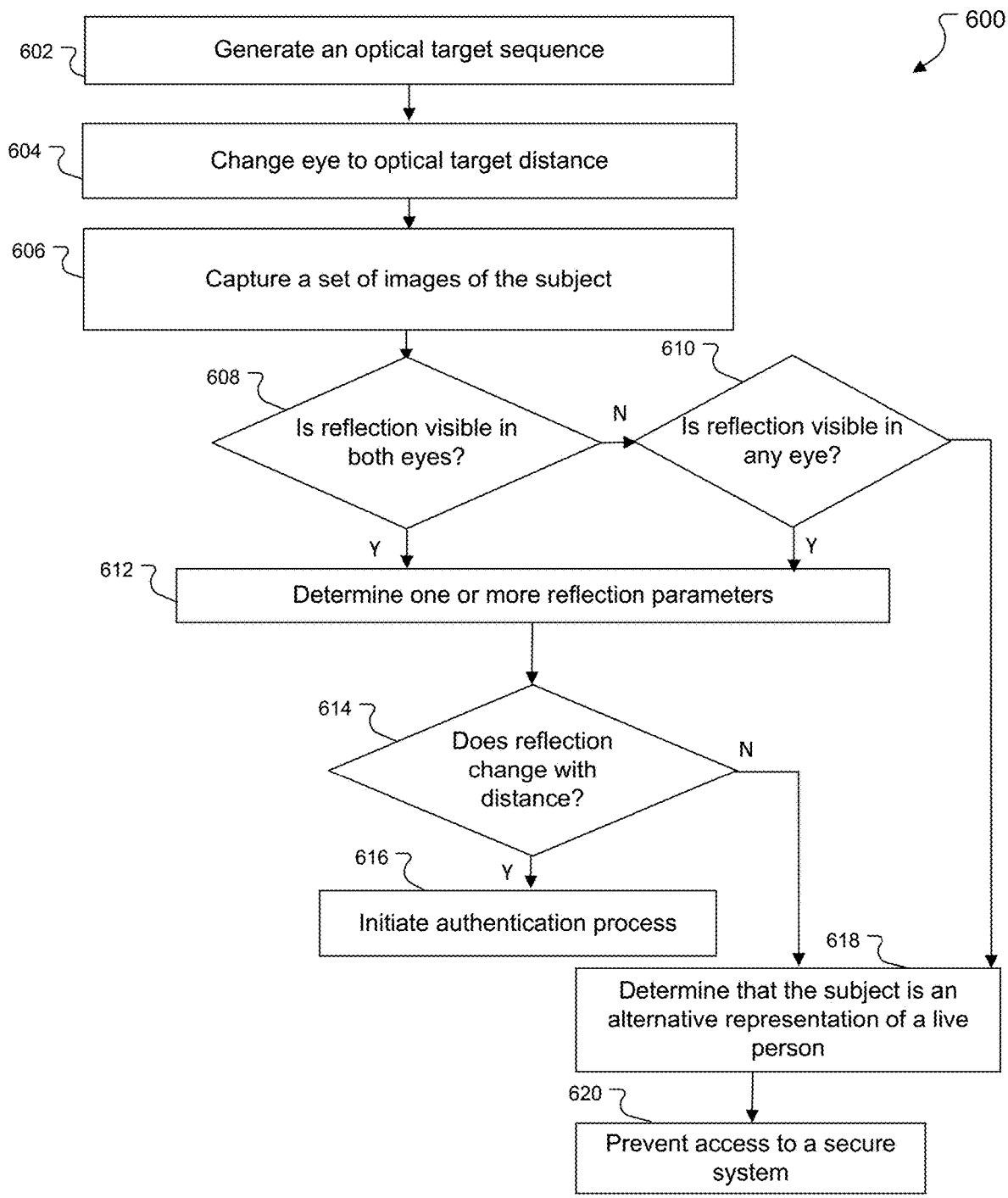
FIG. 6 is another flowchart of an example process in accordance with implementations of the present disclosure.

FIG. 6 depicts another example process 600 for liveness detection. In some implementations, at least a portion of the process 600 can be executed by one of more components of the example architecture 100 described with reference to FIG. 1. In some implementations, at least a portion of the process 600 may be executed by the image analysis engine (e.g., 120 or 122 or 124) depicted in FIG. 1. In some implementations, at least a portion of the process 600 may be executed by one or more servers (e.g., authentication server 108 or computing devices in a distributed computing system as described with reference to FIG. 1) in communication with remote components such as one or more processing devices disposed within a user device (e.g., the user device 102 or the user device 104 as described with reference to FIG. 1).

An optical target sequence can be generated (602). The optical target sequence can include one or more changes of an optical target (e.g., image capture device or portion of a display of an image capture device) relative to subject's eyes according to a sequence of time intervals or time points. The changes can include variations of a position or orientation of the optical target relative to the subject's eyes. In some implementations, the optical target sequence can define two or more different distances between a mobile device (e.g., image capture device) relative to one or both eyes of a subject. For example, one distance between the mobile device and the eyes of a subject can be a fraction (e.g., about half, about a third or about a quarter) of a second distance between the mobile device and the eyes of a subject. In some implementations, the optical target sequence can define one or more optical targets to be displayed at particular locations within a grid of a display of an image capture device (e.g., a kiosk) during a set of time intervals. The grid can include multiple equally sized cells and covers a display panel of a user device. The optical target sequence can define multiple positions corresponding to multiple cells of the grid that are displayed during successive time intervals. The time intervals can be equal in length or can have different durations. In some implementations, the time intervals can be milliseconds to seconds long. In some implementations, the optical target sequence defines a trajectory shape (e.g., Z shape, M shape, O shape, D shape, number 8 shape, number 6 shape or any other letter, number or geometrical figure shape) corresponding to a spatial displacement of the optical target positions and a spatio-temporal frequency of changes between the optical target positions of the trajectory shape. In some implementations, the optical target sequence includes multiple optical target shapes (e.g., circles, squares, rectangles, triangles, etc.) that are simultaneously or subsequently displayed in multiple cells of the grid. In some implementations, the optical target position sequence includes a random cell shape and position selection, appearing as nonrelated jumps between different rows and columns of the grid.

A distance between a subject (e.g., a face of a subject) and the optical target is modified according to the selected optical target sequence (604). The subject (e.g., a face of a subject) can be guided to adjust the optical target (e.g., mobile device) to eye distance or to visually follow the optical targets displayed by the display panel of the user device according to the selected optical target sequence. In some implementations, the user device can provide an output including instructions for a subject to move the user device closer to or further from the face or to move the face closer to or further from the user device. For example, the mobile device can display an image of a pose of a user holding a mobile device (e.g., a selfie pose, an eye level reading pose, or a chest level pose for typing). The image can be displayed on a bright background to increase a contrast of a corneal reflection of the mobile device. In some implementations, the user device can display the optical target with a bright color on a dark background to increase a contrast of the ocular (corneal) reflection. In some implementations, the user device can direct the user to adjust a distance and a face position relative to the camera and display panel portion to optimize a visualization of the ocular reflections (e.g., to maximize signal to noise ratio and to maximize corneal reflection areas in a capturing field of the camera of the user device).

A set of images of the face of the subject is captured (606), wherein each image in the set is captured at a different corresponding relative location of the user device with respect to the subject. For example, the set of captured images can be temporally synchronized with the instructions provided by the user device to change the distance between the mobile device and the subject's eyes. Each of the images can be captured during (at the midpoint of) a display time interval of a displayed instruction or a displayed optical target position in the selected optical target sequence. If the optical target sequence includes timed display of a set number of displayed poses or optical target positions, the user device can capture an image before the instructed change of distance adjustment, the set number of images during the distance change, according to the selected optical target sequence, and an image after the completion of the distance adjustment, i.e., resulting in a total number of images including the set number of images and two additional padding images. The padding images (e.g., images captured before and after the display of poses or display of the selected optical target sequence) can be useful when generating spatially aligned images by using a facial landmark (e.g., inter-ocular distance described with reference to FIGS. 3A and 3B) based alignment stabilization method. In some implementations, there is too much motion in the sequence of images that cannot be aligned or corrected, the image analysis engine can refrain from further processing of the sequence of the images and may restart the capture of the images.

In some implementations, the image capture process can include application of a filter to remove noise, to spatially align the captured images, to extract the regions of interest (e.g., eye regions), and to geometrically normalize images to have substantially equally sized ocular features or ocular metrics between the filtered images. The ocular features can include geometrical characteristics of pupil, pupil center, and iris. The detected eye features can be processed to determine ocular metrics. The ocular metrics can include an inter-ocular distance (e.g., distance between right and left pupil centers).

In some implementations, it is determined whether corneal reflections are visible in both eyes (608). In some implementations, determining whether corneal reflections are visible in both eyes includes processing the regions of interest of both eyes based on shape detection. Within the example described with reference to FIGS. 1-3, if the images are captured by a mobile device held by a user, the rectangular shape of the device (with a given height to width ratio) is searched in the eye images to determine the existence of visible reflections. In response to determining that one of the eye images is missing the reflections, it is determined whether reflections are visible in the other eye (610). In response to determining that both eye images are missing the reflections, it is determined that the subject can be an alternative representation of a live person (618).

In response to determining that the images include the reflections, one or more parameters are determined (612). For example, the images are processed and geometrically normalized (scaled and resized based on the catadioptric system characteristics) to extract the one or more parameters. The one or more parameters can represent corneal reflections of at least one object in at least one eye of the subject. The one or more parameters can include a size of the reflection of the at least one object in each image of the set of captured and processed eye images, of a particular (left or right) eye of the subject. The one or more parameters can include a reflection feature normalized to the inter-ocular distance and the distance between the target object and the pupil center of each eye. In some implementations, the reflection features include size and orientation of reflection of each of the identified corneal reflections. In some implementations, the reflection features include separation between the corresponding reflections of at least one object in the two eyes of the subject for each captured time frame (in each captured eye image). For example, a first separation between the corresponding reflections of at least one object in the two eyes of the subject in a first image is determined. The first image can be included in the set of at least two images and captured with the image capture device being at a first relative location with respect to the subject. A first parameter of the one or more parameters can be computed as a function of a ratio of the first separation to an inter-ocular distance measured from the first image. A second separation between the corresponding reflections of at least one object in the two eyes of the subject in a second image is determined. The second image can be included in the set of at least two images. The second image can be captured with the device being at a second relative location with respect to the subject. A second parameter of the one or more parameters can be computed as a function of a ratio of the second separation to an inter-ocular distance measured from the second image.

It is determined whether the one or more parameters of the geometrically normalized (e.g., scaled and resized) reflection change with the distance (614). A first parameter corresponding to a first image can be compared to a second parameter to determine if the first parameter is different from the second parameter. For example, a first reflection size can be compared to a second reflection size to determine whether the reflection size changes between the captured eye images. Within the context of the provided example, if the image capture device is a mobile device that is moved nearer or farther from the eyes of the subject, the reflection size is expected to increase or decrease, respectively, for a live subject.

In some implementations, a difference between two inter-reflectionary to inter-ocular distance ratios corresponding to two different optical target source locations in the light source location sequence is compared to a threshold corresponding to a predicted reflection size and other shape characteristic (e.g., orientation). In some implementations, the predicted reflection size is extracted from a reflection prediction model, which uses as input the optical target sequence, the inter-ocular distance and one or more reference points or axes (described with reference to FIGS. 3A and 3B) that indicate an orientation of the subject face relative to the optical target (image capturing device). The input is processed using the distance to reflection size and treating the eyes as catadioptric systems (spherical lenses) to generate a set of reflection shape characteristics that corresponds to the measured set of reflection shape characteristics. If any of the determined reflection features (e.g., shape, size, and timing occurrence) does not match a particular predicted reflection size and shape characteristic or the difference is exceeding an acceptable threshold, it is determined that the shape does not change according to the distance change. If all of the determined reflection features (e.g., shape, size, and orientation relative to timing occurrence) match the predicted reflection features, it is determined that the reflection changes extracted from the reflections captured in both eyes (612) or in one eye match the distance changes (614).

If it is determined that the reflection does not change or the reflection changes fail to match the selected distance changes (optical target sequence), it is determined that the subject is an alternative representation of a live person (618).

In some implementations, determining whether the reflection sequence indicates that subject is the alternative representation of the live person can include processing the reflection sequence using a machine learning process trained to discriminate between reflection sequences of live people and artificial reflection sequences of alternative representations of the live people. For example, the machine learning process can include processing the reflection sequences using a trained sequence classification algorithm. The sequence classification algorithm can be trained using sample filtered reflection sequences of live people and sample reflection sequences of spoof attacks. The trained reflection sequence classification algorithm can differentiate subtle shape, depth, and texture features in a reflection sequence. The trained reflection sequence classification algorithm can output a probability that an input reflection sequence includes or does not include predicted reflections and whether or not it is generated from an active illumination of a live person. In some implementations, the reflection sequence classification algorithm can include one or more convolutional neural network (CNN) models. If it is determined that reflections are present and they change with the distance (according to the displayed optical target sequence), an authentication process to authenticate the subject is initiated. In some implementations, the authentication process includes providing an output indicating the classification result (e.g., live person detected) (616).

If it is determined that reflections are missing from the expected region of the eyes in one or more captured and processed images, or the reflections fail to change with the distance, it is determined that the subject is an alternative representation of a live person (618). In some implementation, the alternative representation of the live person includes video replay of the live person on a display panel. In some implementations, the alternative representation of the live person can include a photograph of the live person printed on paper or presented on a display panel. If it is determined that the subject is an alternative representation of a live person, access to a secure system is prevented (620). In some implementations, controlling access to the secure system can include preemptively preventing any of the images to be further processed by the server (e.g., server 108 described with reference to FIG. 1), thereby controlling access to the secure system. In some implementations, controlling access to the secure system can terminate an application of the user device and/or disabling a functionality of the user device for interrupting a network communication with a secure system for a predetermined duration. Controlling access to the secure system can improve performance of an underlying biometric authentication system by filtering out spoof attacks at a front end, and thereby reducing waste of computational resources.

Figure 7:
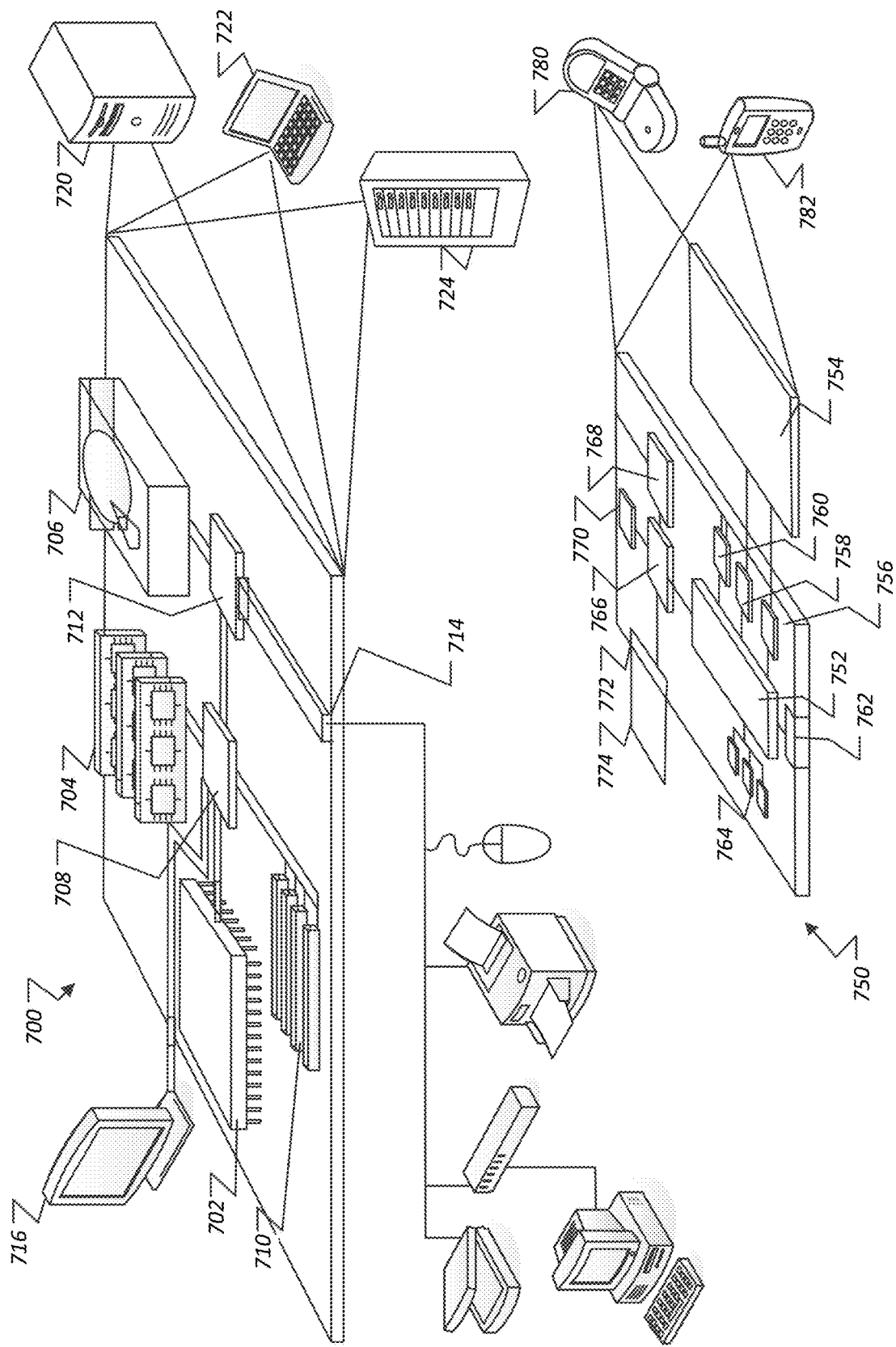
FIG. 7 is a schematic illustration of example computer systems that can be used to execute implementations of the present disclosure.

FIG. 7 shows an example of a computing device 700 and a mobile device 750, which may be used with the techniques described here. For example, referring to FIG. 1, the user device 104 can include one or more of the computing device 700, either in part or in its entirety. The user device 102 can include one or more of the mobile device 750, either in part or in its entirety. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 700 includes a processor 702, memory 704, a storage device 706, a high-speed interface 708 connecting to memory 704 and high-speed expansion ports 710, and a low-speed interface 712 connecting to low-speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a graphical user interface (GUI) on an external input/output device, such as display 716 coupled to high-speed interface 708. In other implementations, multiple processors and/or multiple buses may be used, as appropriate, along with multiple memories and types of memory. Multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, memory on processor 702, or a propagated signal.

The high-speed controller 708 manages bandwidth-intensive operations for the computing device 700, while the low-speed controller 712 manages lower bandwidth-intensive operations. Such an allocation of functions is an example only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., Universal Serial Bus (USB), Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented on a personal computer such as a laptop computer 722. Alternatively, components from computing device 700 may be combined with other components in a mobile device (not shown), such as device 750. Each of such devices may contain one or more of computing devices 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a Thin-Film-Transistor Liquid Crystal Display (TFT LCD) or an Organic Light Emitting Diode (OLED) display, or other appropriate display technology. The display interface 756 may include appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a Single In Line Memory Module (SIMM) card interface. Such expansion memory 774 may provide extra storage space for device 750 or may also store applications or other information for device 750. Specifically, expansion memory 774 may include instructions to carry out or supplement the processes described above and may include secure information also. For example, expansion memory 774 may be provided as a security module for device 750 and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, memory on processor 752, or a propagated signal that may be received, for example, over transceiver 768 or external interface 762.

Device 750 may communicate wirelessly through communication interface 766, which may include digital signal processing circuitry where necessary. Communication interface 766 may provide for communications under various modes or protocols, such as Global System for Mobile Communications (GSM) voice calls, Short Message Service (SMS), Electronic Message Service (EMS), or Multimedia Messaging Service (MMS) messaging, Code Division Multiple Access (CDMA), Time-division multiple access (TDMA), personal digital cellular telecommunication system (PDC), Wideband Code Division Multiple Access (WCDMA), CDMA2000, or General Packet Radio Service (GPRS), among others. Such communication may occur, for example, through radio-frequency transceiver 768. In addition, short-range communication may occur, such as using a Bluetooth, Wi-Fi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. The sound may include sound from voice telephone calls, may include recorded sound (e.g., voice messages, music files, and so forth) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, tablet computer, or other similar mobile device.

The computing device 750 is configured to perform operations comprising obtaining, by an image capture device, a set of at least two images of a subject, wherein each image in the set is captured at a different corresponding relative location of the image capture device with respect to the subject, determining, from the set of images of the subject, one or more parameters representing corneal reflections of at least one object in at least one eye of the subject, determining, based on the one or more parameters, that the subject is a live person, and in response to determining that the subject is a live person, initiating an authentication process to authenticate the subject. In some implementations, the one or more parameters comprise a reflection size. In some implementations, determining the one or more parameters comprises: determining a first size of a reflection of the at least one object in a first image of a particular eye of the subject, the first image being included in the set of the at least two images and captured with the image capture device being at a first distance from the particular eye; and determining a second size of a reflection of the at least one object in a second image of the particular eye, the second image being included in the set of the at least two images and captured with the image capture device being at a second distance from the particular eye, the second distance being different from the first distance. In some implementations, determining that the subject is a live person comprises determining that the first size is different from the second size, and determining that the subject is a live person responsive to determining that the first size is different from the second size. In some implementations, determining the one or more parameters comprises: determining a first separation between the corresponding reflections of the at least one object in the two eyes of the subject in a first image, the first image being included in the set of the at least two images and captured with the image capture device being at a first relative location with respect to the subject, computing a first parameter of the one or more parameters as a function of a ratio of the first separation to an inter-ocular distance measured from the first image, determining a second separation between the corresponding reflections of the at least one object in the two eyes of the subject in a second image, the second image being included in the set of the at least two images and captured with the image capture device being at a second relative location with respect to the subject, and computing a second parameter of the one or more parameters as a function of a ratio of the second separation to an inter-ocular distance measured from the second image. In some implementations, determining that the subject is a live person comprises determining that the first parameter is different from the second parameter, and determining that the subject is a live person responsive to determining that the first parameter is different from the second parameter. In some implementations, determining that the subject is the live person comprises processing the set of the at least two images of the subject using a machine learning process trained to discriminate between live persons and alternative representations of the live persons based on the one or more parameters.

Figure 8:
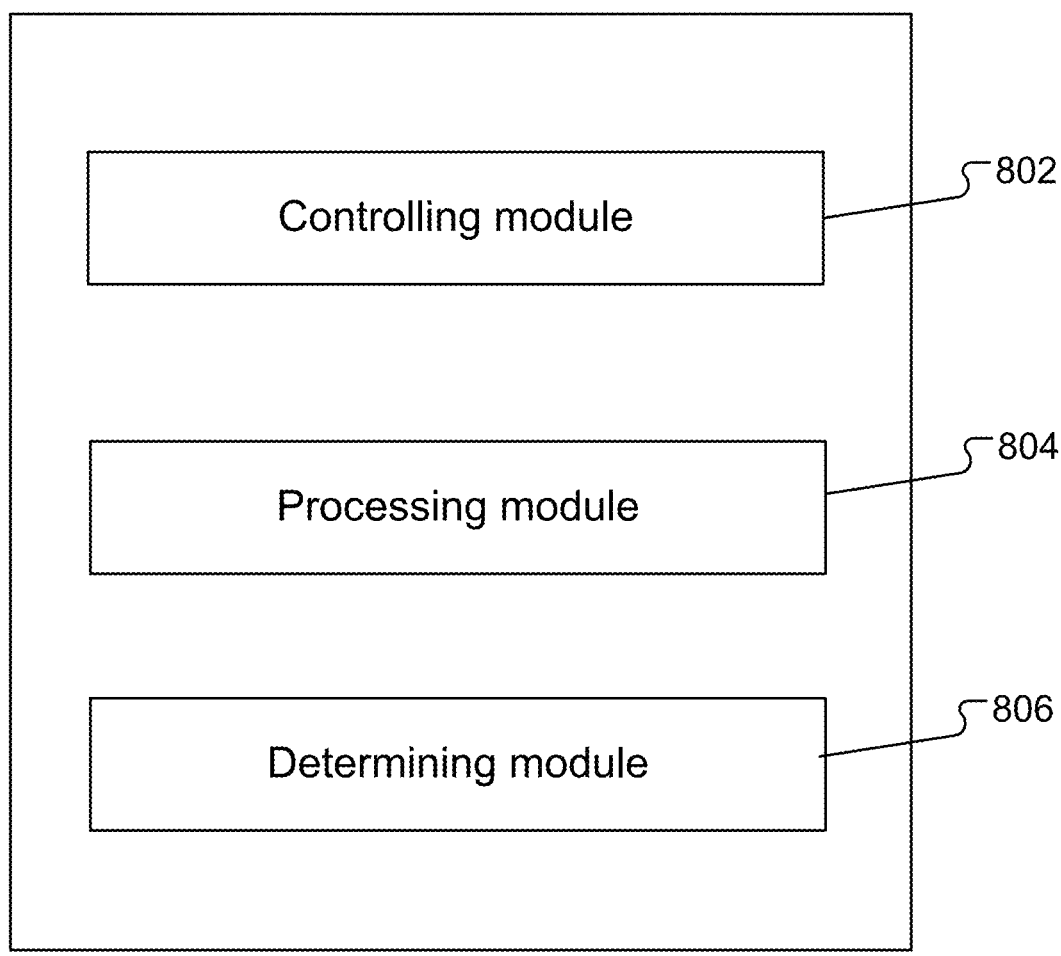
FIG. 8 depicts examples of modules of an apparatus in accordance with implementations of the present disclosure.

FIG. 8 depicts examples of modules of an apparatus 800 in accordance with one or more embodiments of the present disclosure. The apparatus can be an example of an embodiment of a system configured to perform liveness detection using a sequence of images. The apparatus 800 can correspond to the embodiments described above, and the apparatus 800 includes the following: an obtaining module 802 that may control an image acquisition device to capture a sequence of images corresponding to different distances between the subject's eyes and the user device or an optical target and obtain the captured images. The apparatus includes a processing module 804 that processes the sequence of images as described above with reference to FIG. 6 to determine one or more parameters representing corneal reflections of at least one object in at least one eye of the subject. The apparatus also includes a determining module 806 that determines that the subject is either a live human subject or an alternative representation of a live person based on the one or more parameters. In response to determining that the subject is a live person or an alternative representation of a live person, at least one of the processing module 804 or the determining module 806 either initiates/continues an authentication process for the subject, or prevents access to the secure system, respectively.

Various implementations of the systems and techniques described here can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which may be for a special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural, object-oriented, assembly, and/or machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display panel (e.g., a cathode ray tube (CRT) or liquid crystal display (LCD) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a GUI or a web browser through which a user can interact with an implementation of the systems and techniques described here), or any combination of such back end, middleware, or front end components. The components of the system can be interconnected by any form or medium of digital data communication, such as network 106 of FIG. 1. Examples of communication networks include a LAN, a WAN, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications may be made without departing from the scope of the inventive concepts described herein, and, accordingly, other implementations are within the scope of the following claims.

What is claimed is:

1. A computer-implemented method comprising:
   obtaining, by an image capture device, a set of at least two images of a subject, wherein each image in the set is captured at a different corresponding preset location of the image capture device with respect to the subject;
   determining, from the set of images of the subject, one or more parameters representing a set of sizes of corneal reflections of at least one object in at least one eye of the subject, wherein the set of sizes of the corneal reflections comprises at least one of areas of the corneal reflections, heights of the corneal reflections, widths of the corneal reflections, and diagonals of the corneal reflections;
   determining, based on the one or more parameters, that the subject is a live person; and
   in response to determining that the subject is a live person, initiating an authentication process to authenticate the subject.

2. The computer-implemented method of claim 1, wherein determining that the subject is a live person comprises comparing the one or more parameters to one or more eye features and determining changes are consistent with the different corresponding preset location of the image capture device with respect to the subject.

3. The computer-implemented method of claim 1, wherein determining the one or more parameters comprises:
   determining a first size of a reflection of the at least one object in a first image of a particular eye of the subject, the first image being included in the set of the at least two images and captured with the image capture device being at a first distance from the particular eye; and
   determining a second size of a reflection of the at least one object in a second image of the particular eye, the second image being included in the set of the at least two images and captured with the image capture device being at a second distance from the particular eye, the second distance being different from the first distance.

4. The computer-implemented method of claim 3, wherein determining that the subject is a live person comprises:
   determining that the first size is different from the second size; and
   determining that the subject is a live person responsive to determining that the first size is different from the second size.

5. The computer-implemented method of claim 1, wherein determining the one or more parameters comprises:
   determining a first separation between the corneal reflections of the at least one object in two eyes of the subject in a first image, the first image being included in the set of the at least two images and captured with the image capture device being at a first relative location with respect to the subject;
   computing a first parameter of the one or more parameters as a function of a ratio of the first separation to an inter-ocular distance measured from the first image;
   determining a second separation between the corneal reflections of the at least one object in the two eyes of the subject in a second image, the second image being included in the set of the at least two images and captured with the image capture device being at a second relative location with respect to the subject; and
   computing a second parameter of the one or more parameters as a function of a ratio of the second separation to an inter-ocular distance measured from the second image.

6. The computer-implemented method of claim 5, wherein determining that the subject is a live person comprises:

determining that the first parameter is different from the second parameter; and determining that the subject is a live person responsive to determining that the first parameter is different from the second parameter.

7. The computer-implemented method of claim 1, wherein determining that the subject is the live person comprises processing the set of the at least two images of the subject using a machine learning process trained to discriminate between live persons and alternative representations of the live persons based on the one or more parameters.

8. A non-transitory, computer-readable medium storing one or more instructions executable by a computer system to perform operations comprising:

capturing, by an image capture device, a set of at least two images of a subject, wherein each image in the set is captured at a different corresponding relative location of the image capture device with respect to the subject;

determining, from the set of images of the subject, one or more parameters representing a set of sizes of corneal reflections of at least one object in at least one eye of the subject, wherein the set of sizes of the corneal reflections comprises at least one of areas of the corneal reflections, heights of the corneal reflections, widths of the corneal reflections, and diagonals of the corneal reflections;

determining, based on the one or more parameters, that the subject is a live person; and in response to determining that the subject is a live person, initiating an authentication process to authenticate the subject.

9. The non-transitory, computer-readable medium of claim 8, wherein determining that the subject is a live person comprises comparing the one or more parameters to one or more eye features and determining changes are consistent with the different corresponding relative location of the image capture device with respect to the subject.

10. The non-transitory, computer-readable medium of claim 8, wherein determining the one or more parameters comprises:

determining a first size of a reflection of the at least one object in a first image of a particular eye of the subject, the first image being included in the set of the at least two images and captured with the image capture device being at a first distance from the particular eye; and determining a second size of a reflection of the at least one object in a second image of the particular eye, the second image being included in the set of the at least two images and captured with the image capture device being at a second distance from the particular eye, the second distance being different from the first distance.

11. The non-transitory, computer-readable medium of claim 10, wherein determining that the subject is a live person comprises:

determining that the first size is different from the second size; and determining that the subject is a live person responsive to determining that the first size is different from the second size.

12. The non-transitory, computer-readable medium of claim 8, wherein determining the one or more parameters comprises:

determining a first separation between the corneal reflections of the at least one object in two eyes of the subject in a first image, the first image being included in the set of the at least two images and captured with the image capture device being at a first relative location with respect to the subject;

computing a first parameter of the one or more parameters as a function of a ratio of the first separation to an inter-ocular distance measured from the first image;

determining a second separation between the corneal reflections of the at least one object in the two eyes of the subject in a second image, the second image being included in the set of the at least two images and captured with the image capture device being at a second relative location with respect to the subject; and computing a second parameter of the one or more parameters as a function of a ratio of the second separation to an inter-ocular distance measured from the second image.

13. The non-transitory, computer-readable medium of claim 12, wherein determining that the subject is a live person comprises:

determining that the first parameter is different from the second parameter; and determining that the subject is a live person responsive to determining that the first parameter is different from the second parameter.

14. The non-transitory, computer-readable medium of claim 8, wherein determining that the subject is the live person comprises processing the set of the at least two images of the subject using a machine learning process trained to discriminate between live persons and alternative representations of the live persons based on the one or more parameters.

15. A computer-implemented system, comprising:

one or more computers; and one or more computer memory devices interoperably coupled with the one or more computers and having tangible, non-transitory, machine-readable media storing one or more instructions that, when executed by the one or more computers, perform operations comprising:

capturing, by an image capture device, a set of at least two images of a subject, wherein each image in the set is captured at a different corresponding relative location of the image capture device with respect to the subject;

determining, from the set of images of the subject, one or more parameters representing a set of sizes of corneal reflections of at least one object in at least one eye of the subject, wherein the set of sizes of the corneal reflections comprises at least one of areas of the corneal reflections, heights of the corneal reflections, widths of the corneal reflections, and diagonals of the corneal reflections;

determining, based on the one or more parameters, that the subject is a live person; and in response to determining that the subject is a live person, initiating an authentication process to authenticate the subject.

16. The computer-implemented system of claim 15, wherein determining that the subject is a live person comprises comparing the one or more parameters to one or more eye features and determining changes are consistent with the different corresponding relative location of the image capture device with respect to the subject.

17. The computer-implemented system of claim 15, wherein determining the one or more parameters comprises:

determining a first size of a reflection of the at least one object in a first image of a particular eye of the subject, the first image being included in the set of the at least two images and captured with the image capture device being at a first distance from the particular eye; and determining a second size of a reflection of the at least one object in a second image of the particular eye, the second image being included in the set of the at least two images and captured with the image capture device being at a second distance from the particular eye, the second distance being different from the first distance.

18. The computer-implemented system of claim 17, wherein determining that the subject is a live person comprises:

determining that the first size is different from the second size; and determining that the subject is a live person responsive to determining that the first size is different from the second size.

19. The computer-implemented system of claim 15, wherein determining the one or more parameters comprises:

determining a first separation between the corneal reflections of the at least one object in two eyes of the subject in a first image, the first image being included in the set of the at least two images and captured with the image capture device being at a first relative location with respect to the subject;

computing a first parameter of the one or more parameters as a function of a ratio of the first separation to an inter-ocular distance measured from the first image;

determining a second separation between the corneal reflections of the at least one object in the two eyes of the subject in a second image, the second image being included in the set of the at least two images and captured with the image capture device being at a second relative location with respect to the subject; and computing a second parameter of the one or more parameters as a function of a ratio of the second separation to an inter-ocular distance measured from the second image.

20. The computer-implemented system of claim 19, wherein determining that the subject is a live person comprises:

determining that the first parameter is different from the second parameter; and determining that the subject is a live person responsive to determining that the first parameter is different from the second parameter.

* * * * *